United States Patent Office 3,209,245
Patented Sept. 28, 1965

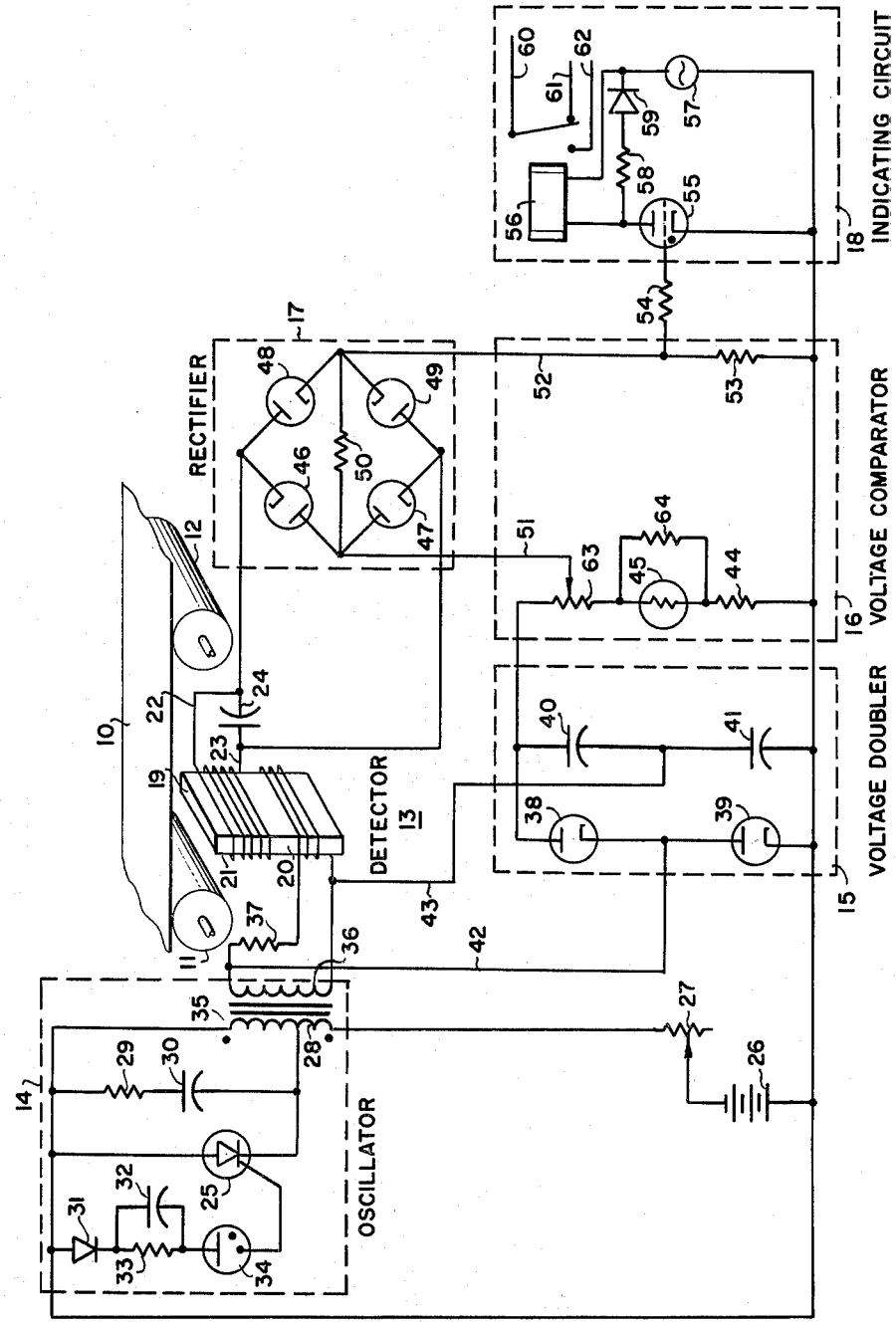

3,209,245
INDUCTIVE METAL DETECTION DEVICE
Lee J. Hauge, Pittsfield, Mass., assignor to General Electric Company, a corporation of New York
Filed Dec. 5, 1961, Ser. No. 157,133
7 Claims. (Cl. 324—41)

This invention relates to the detection of metal and particularly, to the detection of metal by means of an inductive device.

Automated mills, such as steel mills, require devices that will discretely identify the presence of a metal in contradistinction to the presence of scale, steam, or any other material which may be present in a rolling operation. It is desirable that such metal detection devices be of reasonable size and reliability and of a nature to permit inclusion in existing operations without requiring extensive modifications.

Many systems have been devised for detecting metal. Some of these systems rely upon the magnetic properties of particular metals and consequently, are inapplicable where the metal is nonmagnetic. Others, in common with the system to be described hereinafter, rely upon the general conductive properties of metal. These general conductive properties provide the environment for eddy current generation when the metal is brought within a changing magnetic field. By recognizing the presence of such currents in a material being examined, it is possible to determine that metal is present.

Generally, eddy currents have been detected in prior detection systems by noting their effect upon the inductive coupling between a plurality of coils. The systems for implementing this technique often prove cumbersome because they require the establishment of a magnetic field between a plurality of inductive devices within which the material to be examined must be placed. Typically, such coils encircle a test zone or are placed on opposite sides thereof. In some arrangements, one of the coils is energized by alternating current while the voltage induced in a test coil is monitored and compared with a metal-free coupling involving a second test coil of identical nature; the presence of a metal being detected by the different magnitude of induced voltage in each test coil when eddy currents disturb the inductive coupling between coils. In other arrangements, the test coils are used as part of tuned oscillation circuits and the presence of metal is effective to cause mistuning. It has been found that the former arrangements are unsatisfactory because of lack of flexibility and the critical nature of the components required to insure reliability. The latter arrangements are unsatisfactory because of the inherent ambiguity which occurs when magnetic metals are examined. For example, when a magnetic field is present in the examined material, it tends to increase the oscillation amplitude whereas when eddy currents are present in the material, they tend to decrease the amplitude. Critical conditions may arise wherein the magnetic field directly compensates for the eddy current effects and ambiguity occurs because the condition is identical to that experienced in the presence of a nonmetallic material.

An object of the invention is to provide an improved metal detection system that may be installed in conjunction with existing equipment without requiring any alteration thereof.

Another object of the invention is to provide an improved metal detection system that is operative to yield reliable indications of a metal's presence, irrespective of its magnetic properties.

An energized high Q tuned circuit will exhibit different characteristics when in the presence of metal and when such metal is absent. These characteristics are due to the eddy currents generated in the metal. By providing a controlled energization to such a tuned circuit and comparing the magnitude of the energization with the magnitude of the voltage across said tuned circuit, it is possible to detect the presence of a metal. If the circuit is initially tuned to resonance at the energization frequency, any change in Q due to the presence of eddy currents will result in a detectable decrease in the voltage thereacross. Further, since the presence of a magnetic field will cause mistuning and a decrease in the voltage output from the tuned circuit, magnetic metals will also be detected.

Another object of the invention is to utilize a high Q tuned circuit in proximity to a material to be examined for detection of the metallic characteristics thereof. The described tuned circuit is on one side of the material examined only, and the detection circuit is relatively unaffected by variations in oscillating frequency.

In accordance with an illustrative embodiment of the invention, an inductive metal detection system is shown wherein a pair of loosely coupled coils are mounted upon a magnetic core. The first of these coils is energized by an oscillating source having a frequency that will produce eddy currents in the metal to be detected. The second coil is tuned to produce a maximum output voltage at the frequency of said oscillating source when no metallic substances are present. The output voltage of the second coil is rectified and compared with a rectified signal that is commensurate with the input to the first coil. The device is positioned with the second coil interposed between the material being examined and the first coil and in close proximity to the material. When material is examined, a circuit is energized in accordance with the aforementioned comparison of signals to indicate whether the voltage output of the tuned circuit is depressed due to the proximity of the examined material, or unaffected thereby.

The novel features of the invention are set forth with particularity in the appended cliams. The invention itself, however, both as to its organization and method of operation together with further objects and features thereof may best be understood by reference to the following description taken in conjunction with the accompanying drawing which illustrates a typical inductive metal detection system of the type contemplated by the invention.

The circuit illustrates a detector 13 suitably oriented for detecting the presence of a metallic material 10. As shown, material 10 is suspended between rollers 11 and 12 which may be considered as rotating in order to transport the material from one position to another. Of course, the material may be positioned for examination by means of a conveyor belt or in any other suitable fashion, the important factor being that it is in close proximity to detector 13.

Detector 13 comprises a magnetic core 19 and a pair of inductive windings 20 and 21 mounted thereon in a fashion to obtain loose magnetic coupling. Winding 20 is energized with a signal generated in oscillator 14. As a result of this energization, winding 21 has a voltage induced therein which is applied by conductors 22 and 23 across capacitor 24 and a full-wave rectifying bridge 17. The combination of winding 21 and capacitor 24 is tuned to resonance at the operating frequency of oscilator 14 and the circuitry is designed to have a high Q. In other words, the amount of energy stored therein per cycle of operation is much greater than the amount of energy dissipated per cycle of operation.

The voltage developed across the tuned circuit is rectified by full-wave rectifier 17 and compared with a rectified reference voltage that is commensurate with the energizing voltage applied to winding 20 by oscillator 14. This comparison is accomplished in voltage comparator 16. An indicating circuit 18 is used to furnish a discrete indication when the voltage output from full-wave rectifier 17 is below the reference level. Whenever metal is present, the Q of the tuned circuit is decreased due to eddy currents therein and consequently, the rectifier output drops.

A more detailed examination of the circuit elements employed in developing the basic components of the system will lead to a further understanding of the principles involved.

Oscillator 14 consists of a silicon controlled rectifier 25 which is alternately rendered conductive and nonconductive, thereby applying pulses of power to primary 28 of saturable current transformer 35. A source of direct current 26 applies a forward bias between the anode and cathode of silicon controlled rectifier 25 in a circuit comprising the positive terminal thereof, silicon controlled rectifier 25, the lower half of tapped primary 28, a variable resistance 27, and the negative terminal thereof. A conventional rectifier 31 is serially connected with a capacitor 32 and a breakdown diode 34 between the anode and gate electrodes of silicon controlled rectifier 25 in order to supply triggering impulses thereto. Further, a series circuit comprising capacitor 30 and resistance 29 shunts the anode-cathode path of silicon controlled rectifier 25. The upper portion of tapped primary winding 28 also shunts the anode-cathode path.

When power is applied, oscillator 14 generates an alternating current in secondary 36 of saturable current transformer 35 in accordance with the following operation.

The controlled rectifier 25 is initially nonconductive and therefore current flows downward through both legs of tapped primary 28. The primary of this transformer is so wound that the magnetic flux in the core due to the current in the upper portion of the primary opposes and overcomes the flux due to the current in the lower portion, and the core becomes saturated in the negative direction. The cathode and gate of the controlled rectifier 25 are thereupon biased negatively with respect to the anode due to the voltage drop across the upper portion of primary 28 (i.e., controlled rectifier 25 is forward biased). This voltage condition causes breakdown diode 34 to become conductive, which in turn fires controlled rectifier 25. When controlled rectifier 25 is conductive, considerable current flows in the lower portion of primary 28, driving the core toward positive saturation. The lower and upper portion of primary 28 then act as an autotransformer, and a voltage which is positive with respect to the upper terminal is induced on the tap thereof. This voltage charges capacitor 30 through resistor 29 until capacitor 30 becomes charged enough to reverse bias and shut off controlled rectifier 25. During the time that controlled rectifier 25 is conductive, capacitor 32 is negatively charged on its lower plate, cutting off diode 34. Capacitor 32 then discharges through resistor 33. By the time capacitor 32 has discharged, allowing diode 31 to become conductive again, the cathode of controlled rectifier 25 will again be negatively biased with respect to its anode. This allows breakdown diode 34 to become conductive, and the cycle repeats itself.

The voltage appearing across secondary winding 36 is used to energize detector 13 and also to develop a reference voltage against which the rectified output from secondary winding 21 of detector 13 may be compared. The reference voltage is developed in a conventional voltage doubler 15 comprising series connected diodes 38, 39, connected in parallel with series connected capacitors 40, 41. Leads 42 and 43 connect opposite ends of secondary winding 36 to the junctions between the respective diodes and capacitors. As is well known, the voltage across the series combination of capacitor 40 and capacitor 41 has a magnitude approximately equal to twice the peak value of that applied between leads 42 and 43.

A resistive network comprising potentiometer 63, resistor 64, and resistor 44 is serially connected across the output of voltage doubler 15 and supplies the reference against which the rectified output from secondary winding 21 is compared. In order to obtain stability of operation throughout a range of temperature changes, a thermistor 45 is included in this series resistive network by connecting it in parallel with resistor 64. With the circuit shown, it will be understood that a reference voltage of any desired magnitude may be obtained between the slider of potentiometer 63 and the lower end of resistor 44.

The output of the tuned circuit of detector 13 is directly connected across a conventional full-wave rectifying bridge 17 comprising four diodes, 46, 47, 48, and 49. A high impedance load resistor 50 is connected as a load on the bridge and thereby prevents undesired loading on the high Q tuned circuit. The full-wave rectified voltage appearing across resistor 50 is directly compared with the reference voltage from voltage doubler 15 in voltage comparator 16; the comparison taking place across resistor 53 which is used as a biasing resistor for the indicating circuit 18.

The comparison circuit essentially comprises the series circuit of: full-wave rectifier 17, resistors 53 and 44, resistor 64 and thermistor 45 in parallel, and potentiometer 63. Recognizing that the polarities from the voltage doubler and the full-wave rectifier are in opposition, it will be seen that the difference between these voltages appears directly across resistor 53. This voltage is applied via coupling resistor 54 to the grid of a thyratron 55 that is an integral part of indicating circuit 18.

When no conductive material is present, the slider on potentiometer 63 is adjusted to furnish a positive voltage on the upper end of resistor 53 which is sufficient to render thyratron 55 conductive on appropriate application of potential between the plate and cathode electrodes thereof. Whenever the voltage from rectifying bridge 17 decreases due to the presence of a magnetic or conductive material, the voltage on the upper end of resistor 53 also decreases, making it impossible for thyratron 55 to conduct. The conduction of thyratron 55 is thus indicative of an absence of a metal.

In order to translate the conduction of thyratron 55 into a positive indication, relay 56 has been provided. The windings of relay 56 are serially connected with alternating current source 57 between the anode and cathode of thyratron 55 and consequently, it is energized whenever thyratron 55 is conductive. In order to provide a static signal, a resistor 58 is serially connected with a suitably oriented rectifier 59 directly across the windings of relay 56 providing a current path for the inductive energy in the coil of relay 56 which is dissipated during the portion of each cycle when the plate of thyratron 55 is driven negative. The contacts of relay 56 are arranged to provide a short circuit between conductors 60 and 61 when the relay is not energized. This condition indicates an absence of a metallic material. When relay 56 is energized, a short circuit exists between conductors 60 and 62 which indicates the presence of a metallic material. It will be understood by those skilled in the art that these short circuit conditions may be adapted in any number of ways to perform control functions or to activate other indicating equipment.

The described embodiment illustrates one arrangement for utilizing a high Q tuned circuit in order to detect the presence or absence of a metal. The described circuit eliminates the ambiguities inherent in detection circuits heretofore developed and furnishes a simple and conveniently applied means for accomplishing a vital function.

While the above described circuit constitutes a particular embodiment of the invention it will, of course, be understood that it is not wished to be limited thereto since modifications can be made both in the circuit arrangement and in the instrumentalities employed and it is contemplated in the appended claims to cover any such modifications as fall within the true spirit and scope of the invention.

What is claimed as new and desired to be secured by Letters Patent of the United States is:

1. A metal detection system comprising, a source of alternating current having a frequency effective to produce eddy currents in said metal, a high Q circuit tuned to resonate at the frequency of said alternating current, means for inductively coupling said high Q circuit with said source of alternating current thereby developing a voltage thereacross, and amplitude detecting means responsive to said voltage for detecting a reduction thereof due to the proximity of said metal.

2. A metal detection system comprising, a source of alternating current having a frequency effective to produce eddy currents in said metal, a high Q circuit tuned to resonate at the frequency of said alternating current, means for inductively coupling said high Q circuit with said source of alternating current thereby developing a voltage thereacross, means for bringing a metal in close proximity with said high Q tuned circuit, and amplitude detecting means responsive to said voltage for detecting a reduction thereof.

3. A system as defined in claim 2 wherein said amplitude detecting means comprises a first rectifying means operative in response to said alternating current to develop a first unipolarity voltage, a second rectifying means operative in response to the voltage across said high Q circuit to develop a unipolarity voltage commensurate in the magnitude therewith, and comparison means operative to yield a discrete indication when the difference between said unidirectional voltages exceeds a predetermined value.

4. A metal detection system comprising, a source of alternating current having a frequency effective to produce eddy currents in metals of the type to be detected, a first inductive means energized by said alternating current, a second inductive means inductively coupled to said first inductive means and having a voltage induced therein in response to said alternating current, means connected with said second inductive means to form a high Q circuit resonant at the frequency of said alternating current, first rectifying means directly responsive to said alternating current to provide a reference voltage, second rectifying means responsive to the voltage across said high Q circuit to provide a test voltage, comparison means for comparing the magnitudes of said reference voltage and said test voltage and providing a signal commensurate with the difference therebetween, and means controlled by said signal and operative when said difference exceeds a critical value to furnish a discrete indication.

5. In a system for distinguishing between metals and other substances, a source of alternating current having a frequency effective to produce eddy currents in said metals, a core, a first coil mounted upon said core and energized by said alternating current, a second coil mounted upon said core and inductively coupled to said first coil, means connected to said second coil to form a high Q circuit resonant at the frequency of said alternating current, means for bringing material to be distinguished into close proximity with said second coil, first rectifying means directly responsive to said alternating current to provide a unipolarity reference voltage, second rectifying means responsive to the voltage across said high Q circuit to provide a unipolarity test voltage, and indicating means controlled by the difference between said reference voltage and said test voltage and operative when said test voltage decreases in magnitude.

6. A system as defined in claim 5 wherein said first rectifying means comprises, means for rectifying said alternating current, and control means for adjustably selecting a reference voltage level from the output of said latter means when no metal is in close proximity to said second coil thereby establishing a predetermined voltage difference between said reference voltage level and said test voltage.

7. A system as defined in claim 6 wherein said indicating means comprises, a relay means, and means controlled by said reference voltage and said test voltage and operative in response to a departure from said predetermined voltage difference to energize said relay means.

References Cited by the Examiner

UNITED STATES PATENTS

| 2,147,746 | 2/39 | Luck et al. | 324—41 |
| 2,220,070 | 11/40 | Aiken | 324—41 |
| 2,580,670 | 1/52 | Gilbert | 324—41 |
| 2,819,447 | 1/58 | Harmon | 324—41 |
| 2,875,429 | 2/59 | Quade | 324—41 |
| 2,994,015 | 7/61 | Eidam | 324—41 |

FOREIGN PATENTS 760,780 11/56 Great Britain.

RICHARD B. WILKINSON, *Primary Examiner.*

WALTER L. CARLSON, *Examiner.*